(12) United States Patent
Kouzuma

(10) Patent No.: US 10,202,037 B2
(45) Date of Patent: Feb. 12, 2019

(54) REACTION FORCE OUTPUT DEVICE

(71) Applicant: HONDA LOCK MFG. CO., LTD., Miyazaki-shi, Miyazaki (JP)

(72) Inventor: Hiroyuki Kouzuma, Miyazaki (JP)

(73) Assignee: Honda Lock Mfg. Co., Ltd., Miyazaki (JP)

( * ) Notice: Subject to any disclaimer, the term of this patent is extended or adjusted under 35 U.S.C. 154(b) by 0 days.

(21) Appl. No.: 15/543,823

(22) PCT Filed: Mar. 2, 2016

(86) PCT No.: PCT/JP2016/056395
§ 371 (c)(1),
(2) Date: Jul. 14, 2017

(87) PCT Pub. No.: WO2016/140257
PCT Pub. Date: Sep. 9, 2016

(65) Prior Publication Data
US 2017/0368935 A1 Dec. 28, 2017

(30) Foreign Application Priority Data
Mar. 4, 2015 (JP) ................. 2015-042297

(51) Int. Cl.
*B60K 26/02* (2006.01)
*G05G 5/03* (2008.04)

(52) U.S. Cl.
CPC ............ *B60K 26/021* (2013.01); *B60K 26/02* (2013.01); *G05G 5/03* (2013.01); *B60K 2026/023* (2013.01); *G05G 2505/00* (2013.01)

(58) Field of Classification Search
CPC ............ B60K 26/021; B60K 2026/022; B60K 2026/023; B60K 2026/026; G05G 5/03
See application file for complete search history.

(56) References Cited

U.S. PATENT DOCUMENTS

| | | | | |
|---|---|---|---|---|
| 2,952,165 A | * | 9/1960 | Bade | F16H 1/20 74/421 R |
| 5,189,621 A | * | 2/1993 | Onari | B60K 31/0008 123/480 |
| 5,625,558 A | * | 4/1997 | Togai | B60K 31/047 123/349 |

(Continued)

FOREIGN PATENT DOCUMENTS

| | | |
|---|---|---|
| EP | 2 578 433 A1 | 4/2013 |
| JP | 2004-314871 A | 11/2004 |

(Continued)

OTHER PUBLICATIONS

PCT/ISA/210 from PCT/JP2016/056395 in both Japanese and English languages.

(Continued)

*Primary Examiner* — Thomas G Black
*Assistant Examiner* — Sara J Lewandroski
(74) *Attorney, Agent, or Firm* — Carrier Blackman & Associates, P.C.; Joseph P. Carrier; Jeffrey T. Gedeon

(57) ABSTRACT

A reaction force output device includes a driving part configured to transmit a driving force of a motor to a driving member through a gear mechanism to drive the driving member, thereby outputting a force in a direction opposite to an operating direction of an operation element to the operation element operated by a driver; and a controller configured to determine a control amount applied to the driving part based on an input value supplied from an outside, wherein the controller gradually increases the control amount, maintains the control amount at a constant value and then increases the control amount stepwise when increasing the control amount according to the input value.

3 Claims, 14 Drawing Sheets

(56) References Cited

U.S. PATENT DOCUMENTS

| | | | | |
|---|---|---|---|---|
| 6,116,214 | A * | 9/2000 | Ishida | F02D 11/107 123/198 D |
| 2005/0056253 | A1 * | 3/2005 | Yone | F02D 11/106 123/399 |
| 2009/0026998 | A1 * | 1/2009 | Ueno | B60L 7/14 318/703 |
| 2011/0098900 | A1 * | 4/2011 | Shiomi | B60K 26/021 701/70 |
| 2012/0143441 | A1 | 6/2012 | Yamazaki et al. | |
| 2012/0216652 | A1 * | 8/2012 | Yamazaki | B60K 26/021 74/513 |
| 2014/0116379 | A1 * | 5/2014 | Maruyama | B60K 26/021 123/349 |
| 2016/0221437 | A1 * | 8/2016 | Takegawa | B60K 26/021 |
| 2016/0246321 | A1 * | 8/2016 | Ooba | B60K 26/02 |

FOREIGN PATENT DOCUMENTS

| | | | | |
|---|---|---|---|---|
| JP | 2007083782 A | * | 4/2007 | ........... B60K 26/021 |
| JP | 2007-137152 A | | 6/2007 | |
| JP | 2010-111379 A | | 5/2010 | |
| JP | 2014-078174 A | | 5/2014 | |
| JP | 2015-041252 A | | 3/2015 | |
| WO | 2013/136744 A1 | | 9/2013 | |
| WO | 2014/080468 A1 | | 5/2014 | |

OTHER PUBLICATIONS

Extended European search report dated Oct. 24, 2018, issued in the corresponding EP Patent Application 16758950.6.

Office Action issued in the corresponding Chinese Patent Application No. 201680009710.8 with the English translation thereof.

* cited by examiner

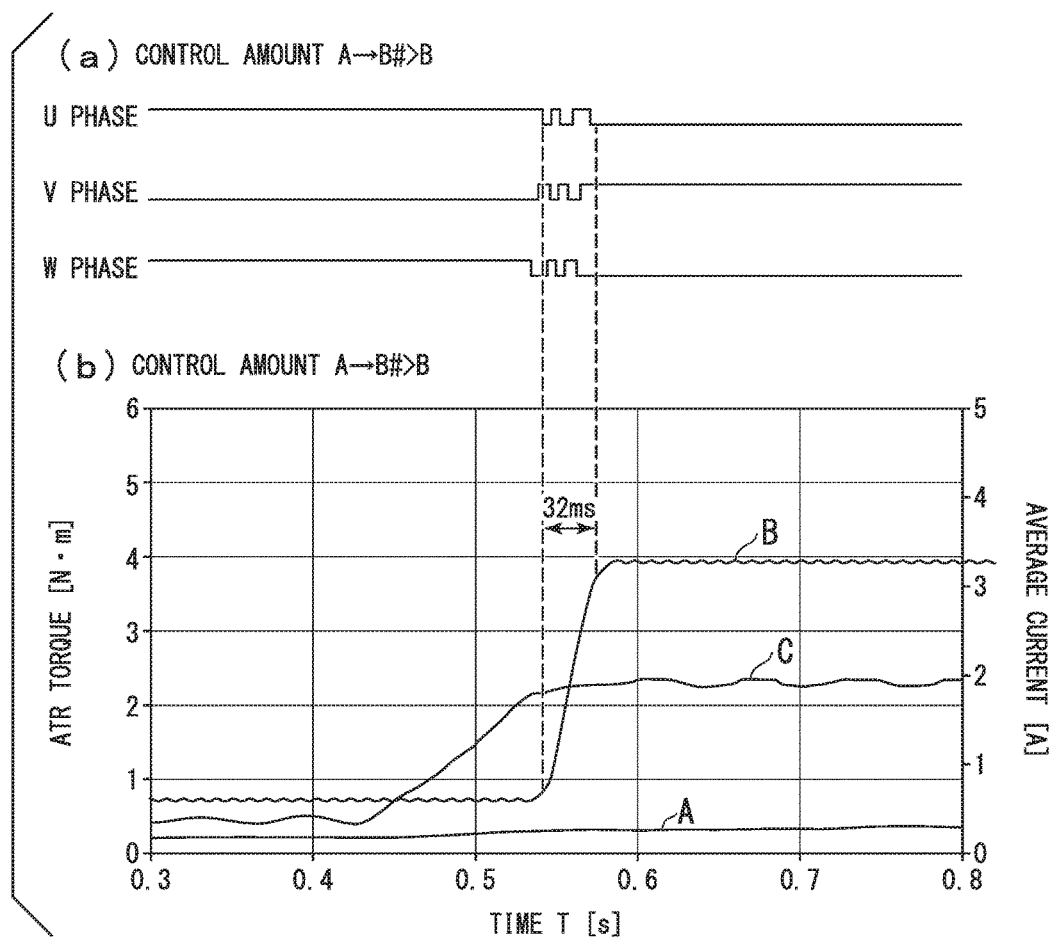

REACTION FORCE OUTPUT DEVICE

TECHNICAL FIELD

The present invention relates to a reaction force output device.

Priority is claimed on Japanese Patent Application No. 2015-042297 filed Mar. 4, 2015, the content of which is incorporated herein by reference.

BACKGROUND ART

An accelerator pedal apparatus which outputs a force (a reaction force) to an accelerator pedal in a direction opposite to that of a force (a depression force) for depressing the accelerator pedal to suppress unexpected sudden acceleration or the like when a vehicle starts or runs is known (for example, referring to the following Patent Literature 1).

In the accelerator pedal apparatus disclosed in Patent Literature 1, a return spring for returning the accelerator pedal to an initial position, a motor for generating a reaction force and a lever for transmitting rotation of the motor to a pedal arm are built in a housing which rotatably supports a base end of the pedal arm. In the accelerator pedal apparatus, the motor is controlled by a control device to output according to a depression state of the accelerator pedal, and an output thereof is applied to the accelerator pedal through the transmission lever.

CITATION LIST

Patent Literature

[Patent Literature 1]
Japanese Unexamined Patent Application, First Publication No. 2010-111379

SUMMARY OF INVENTION

Technical Problem

However, since a conventional reaction output device includes a motor, a gear mechanism which is connected to the motor, and a pedal (an operation element) mechanism which is connected to the gear mechanism, a reaction force output to the operation element may be small, and it may not be possible to provide a desired high reaction force.

The present invention is made in view of such problems, and an object of the present invention is to provide a reaction force output device which allows a higher reaction force through an operation element.

Solution to Problem

In order to solve the aforementioned problems, the present invention adopts the following aspect.

(1) A reaction force output device according to one aspect of the present invention includes a driving part configured to transmit a driving force of a motor to a driving member through a gear mechanism to drive the driving member, thereby outputting a force in a direction opposite to an operating direction of an operation element to the operation element operated by a driver; and a controller configured to determine a control amount applied to the driving part based on an input value supplied from an outside, wherein the controller gradually increases the control amount, maintains the control amount at a constant value and then increases the control amount stepwise when increasing the control amount according to the input value.

According to the above-described aspect (1), since the reaction force output device increases the control amount, maintains a control value at a constant value and then increases the control amount stepwise when a driver is notified by operating the operation element, the driver may be able to feel a higher reaction force.

(2) In the above-described aspect (1), the controller may gradually increase the control amount, may maintain the control amount at a constant value and then may increase the control amount stepwise when an increase amount of the input value per unit time exceeds a predetermined value.

In the case of the aspect (2), since the reaction output device gradually increases the control amount, maintains the control amount at a constant value and then increases the control amount stepwise when the increase amount of the input value per unit time exceeds the predetermined value, the driver may be able to feel the higher reaction force when the operation element is depressed more than necessary.

(3) In the above-described aspect (1), the controller may shorten a time that the control amount is increased stepwise as an operating speed of the operation element is increased, and thus an inclination of an increase of the control amount may be increased.

In the case of the aspect (3), since a load of the operation element is increased within a short time as the operating speed of the operation element is increased, the driver may be able to feel the higher reaction force.

Advantageous Effects of Invention

According to the embodiments of the present invention, it is possible to provide a reaction force output device which allows a higher reaction force through an operation element.

BRIEF DESCRIPTION OF DRAWINGS

FIG. 17 is a timing chart showing the three-phase current (a), the average value of the test motor (A in (b)), the ATR torque (B in (b)) and the average value current (C in (b)) when the reaction force set value P (the current instruction value I) is changed from P2 to P4 (>P3) while the pedal arm of the reaction force output device according to one embodiment is fixed.

DESCRIPTION OF EMBODIMENTS

Hereinafter, a reaction force output device of an embodiment of the present invention will be described with reference to the drawings. The reaction force output device of one embodiment is, for example, a device which outputs a force (a reaction force) in a direction opposite to a depression force (a pedaling force) to an operation element such as an accelerator pedal provided for instructing acceleration of a vehicle. By using the reaction force output device, it is possible to improve an accelerator feeling, to transmit accelerator work to save fuel consumption and to perform various types of safety control. As the safety control, there is control for outputting a comparatively large reaction force to suppress excessive acceleration in front of a curve, an urban area, a school zone or the like. In addition, when a sudden operation of the accelerator pedal exceeding a standard is performed, it may be determined that the operation is erroneous and thus a control for outputting the large reaction force may be performed. Also, the operation element which is an output target of the reaction force in the present embodiment is not limited to the accelerator pedal but may be a brake pedal, a steering wheel or an operation device of a game machine.

Figure 1:
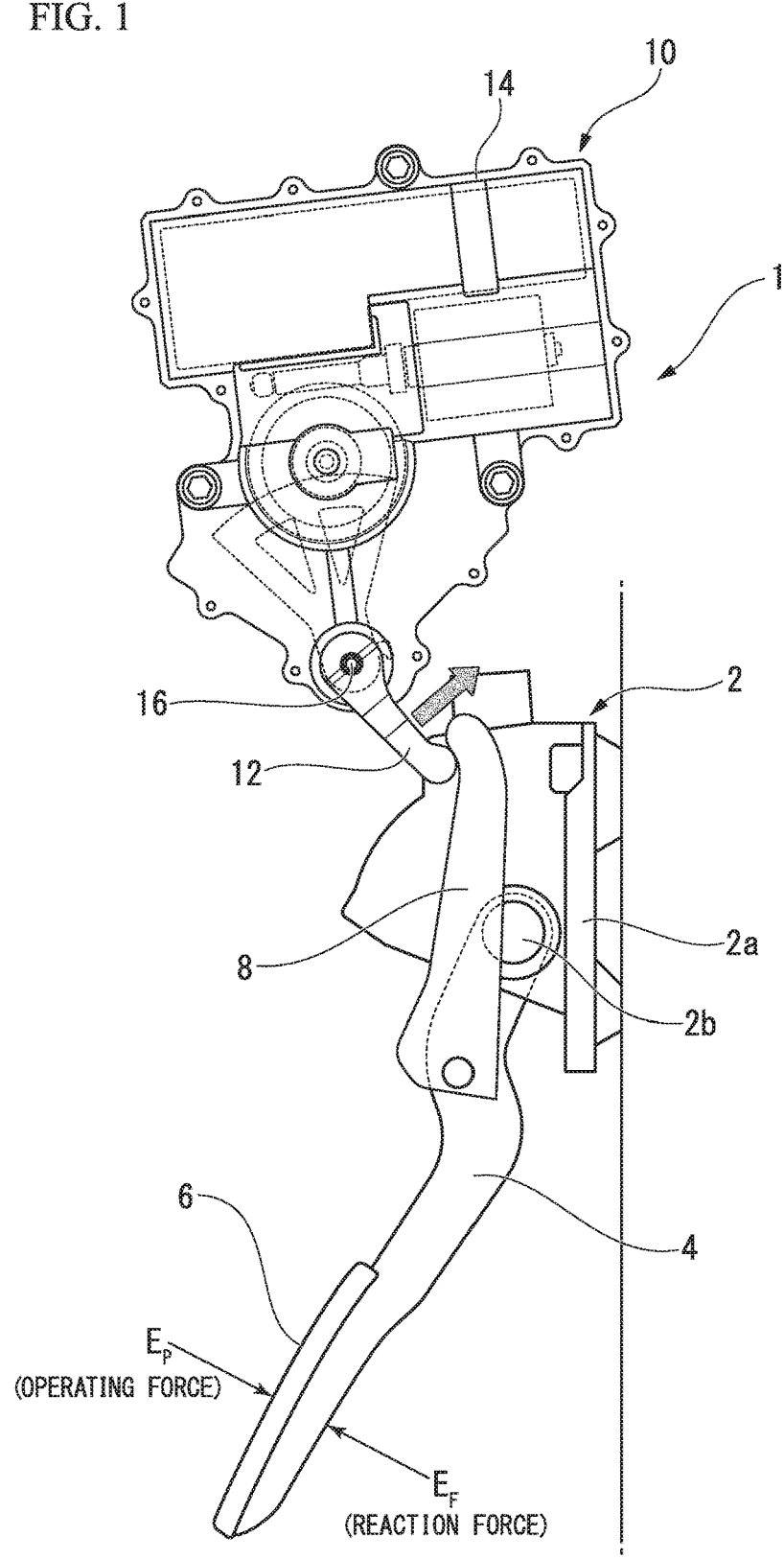
FIG. 1 is a view illustrating an example of an external constitution of an accelerator pedal apparatus including a reaction force output device according to one embodiment.

FIG. 1 is a view illustrating an example of an external constitution of an accelerator pedal apparatus 1 including a reaction force output device 10 according to one embodiment.

An accelerator pedal apparatus 1 includes a pedal body unit 2 which is installed in front of a foot area of a driver's seat and a reaction force output device 10 which is installed above the pedal body unit 2.

The pedal body unit 2 includes a holding base 2a which is installed at a vehicle body, a pedal arm 4 (an operation element) of which a base end is rotatably supported by a support shaft 2b provided at the holding base 2a, and a pedal body portion 6 (an operation element) which is provided at a tip end of the pedal arm 4 and to which a depression force is provided by a driver. A return spring (not shown) which always biases the pedal arm 4 toward an initial position is provided at the holding base 2a.

A cable (not shown) which serves to operate an opening degree of a throttle valve (not shown) of an internal combustion engine (an engine) according to an operation amount (a rotation angle) of the pedal arm 4 is connected to the pedal arm 4. However, when the internal combustion engine employs an electronically controlled throttle, a rotation sensor for detecting the rotation angle of the pedal arm 4 may be provided at the pedal body unit 2, and the opening degree of the throttle valve may be controlled on the basis of a detection signal of the rotation sensor. Also, a reaction force transmission lever 8 (an operation element) which extends in a direction approximately opposite to an extending direction of the pedal arm 4 is integrally connected to the vicinity of a base end of the pedal arm 4.

Further, a tip end of an output lever 12 which is a driving member of the reaction force output device 10 and a tip end of the reaction force transmission lever 8 are formed to come in contact with each other. A rotational force of the output lever 12 which is the driving member of the reaction force output device 10 is output to the pedal arm 4 through the reaction force transmission lever 8. As described above, the reaction force output device 10 outputs the reaction force to the operation element (e.g., the reaction force transmission lever 8) in a direction opposite to that of the depression force.

Figure 2:
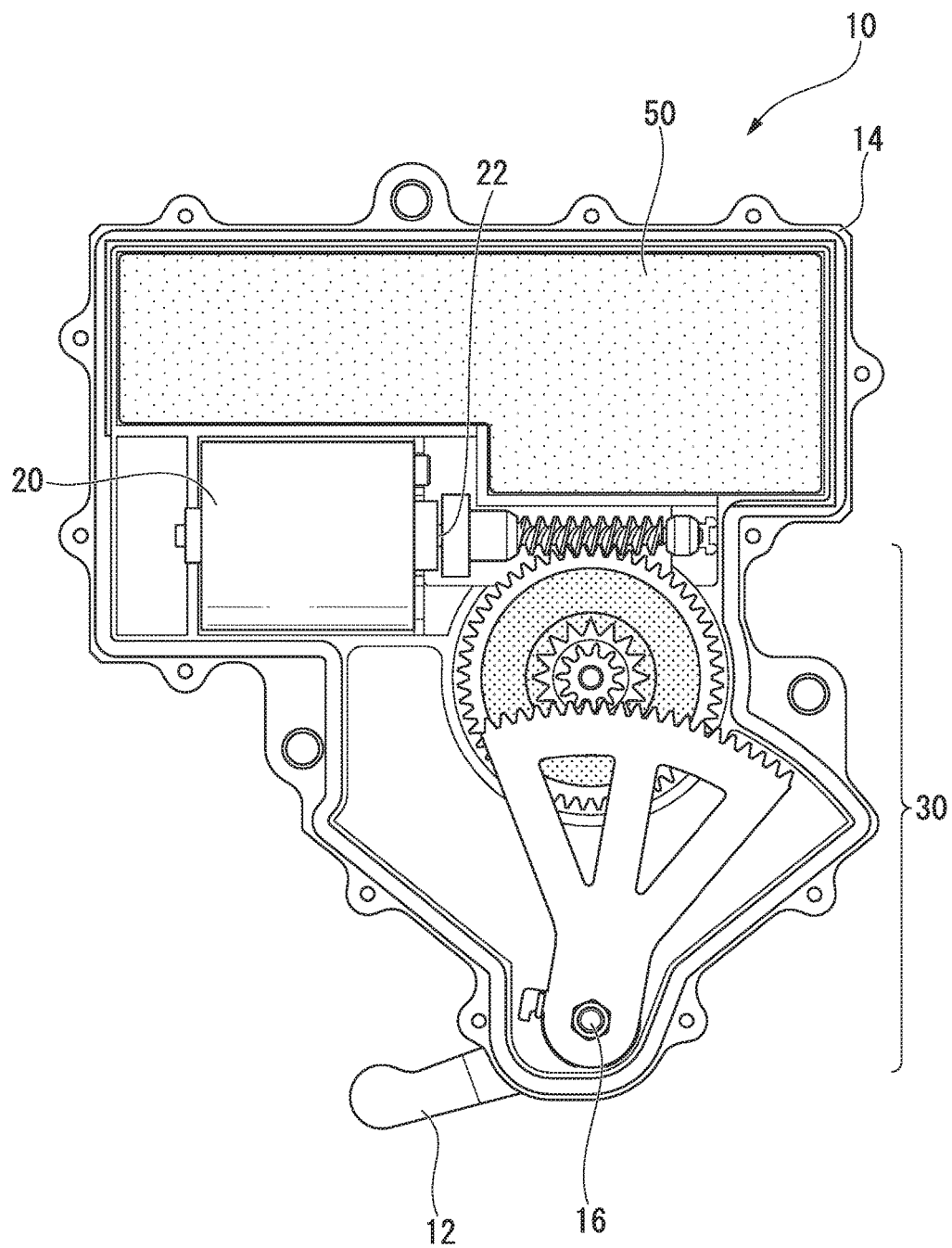
FIG. 2 is a view illustrating an example of an internal structure of the reaction force output device of one embodiment.

FIG. 2 is a view illustrating an example of an internal structure of the reaction force output device 10. FIG. 2 illustrates an internal state of a housing member 14 (the reaction force output device 10) in which a cover of an upper surface of the housing member 14 is removed. The reaction force output device 10 of the embodiment includes a motor 20 which is a drive source for generating the reaction force, a reaction force output shaft 16 (a driving part) which is pivotably supported by the housing member 14, a gear reduction mechanism 30 (a gear mechanism) and a circuit board 50 (a controller).

The gear reduction mechanism 30 reduces rotation of a rotor of the motor 20 to increase a torque T output from the motor 20 side and transmits the increased torque T, which is deflected from a direction of a rotary shaft 22 of the motor toward a direction of the reaction force output shaft 16, to the output lever 12. One end in the direction of the reaction force output shaft protrudes outward from a side surface of the housing member 14, and the output lever 12 is integrally connected to the protruding end.

The rotation of the rotor of the motor 20 is controlled by a control circuit mounted on the circuit board 50. A host electronic control unit (ECU) which will be described later and a controller area network (CAN) cable (not shown) for transmitting and receiving a signal to/from the control circuit are connected to the circuit board 50. Further, the circuit board 50 and the motor 20 are connected to each other through a cable (not shown), and the rotation of the rotor of the motor 20 is controlled on the basis of a control signal transmitted from the circuit board 50. Also, a small hole or a slit is provided at a case which covers the rotator of the motor 20, and a Hall integrated circuit (IC) is inserted into the small hole or the slit. The Hall IC detects a magnetic flux intensity passing through the small hole or the slit and outputs a pulse-shape voltage corresponding to the detected magnetic flux intensity. The magnetic flux intensity detected by the Hall IC is changed according to the rotation of the rotor of the motor 20. Therefore, the reaction force output device 10 may detect a rotation amount (for example, the number n [rpm] of rotations) of the rotor based on an output voltage of the Hall IC.

Figure 3:
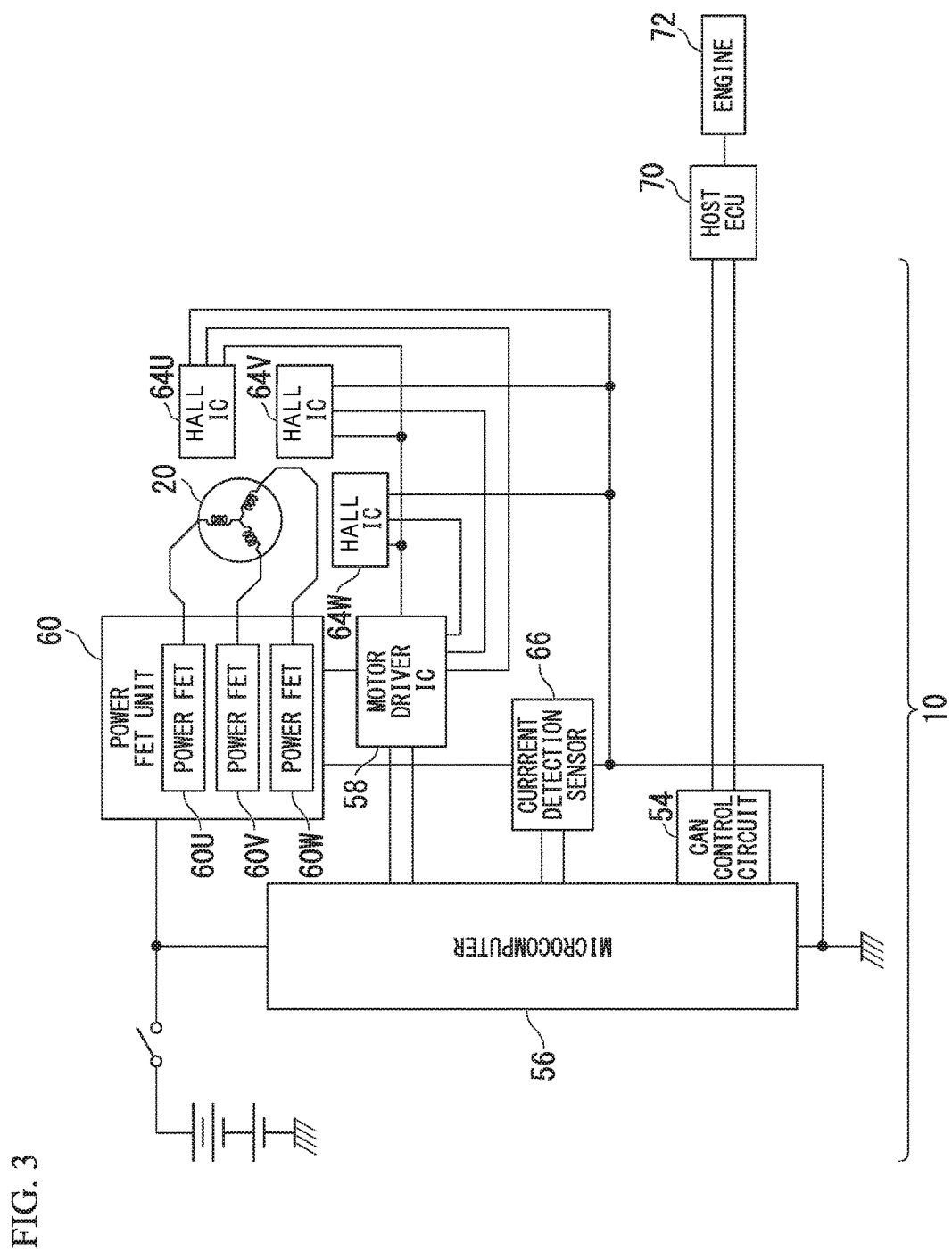
FIG. 3 is a view illustrating an example of a functional constitution centering on a control circuit of the reaction force output device according to one embodiment.

FIG. 3 is a view illustrating an example of a functional constitution centering on the control circuit of the reaction force output device 10 according to one embodiment. In FIG. 3, the reaction force output device 10 includes a CAN control circuit 54 which performs CAN communication between the motor 20 and the host ECU 70, a microcontroller (microcomputer) 56 (a controller), a motor driver IC 58, a power field effect transistor (FET) 60, Hall ICs 64U, 64V and 64W, a Hall IC 64, and a current detection sensor 66. Also, in the following description, the Hall ICs 64U, 64V and 64W are collectively referred to as Hall ICs 64 unless otherwise distinguished.

The host ECU 70 controls, for example, the opening degree of the throttle valve according to the operation amount of the pedal arm 4 and controls driving of an engine 72. In the engine 72, a crankshaft which is an output shaft is connected to an axle and outputs a traveling driving force of a vehicle. Also, as a travel driving part, a configuration in which a traveling motor is added to the engine 72 may be used, or a configuration in which the traveling driving force is output only by the traveling motor without the engine 72 may be used.

The microcomputer 56 performs the CAN communication with the host ECU 70 through the CAN control circuit 54. The microcomputer 56 receives a reaction force set value P, which is a reference of a magnitude of the reaction force generated by the reaction force output device 10, from the host ECU 70. The reaction force set value P is an example of "an input value." For example, the reaction force set value P may be determined to be increased in accordance with a vehicle speed of the vehicle in which the reaction force output device 10 is installed and may be determined to suppress a sudden accelerator operation, thereby improving fuel efficiency. Also, the reaction force set value P may be determined to be larger as a distance between a vehicle in which the reaction force output device 10 is installed and a preceding vehicle becomes shorter. The distance between the vehicles is obtained by, for example, a millimeter wave radar or a sound wave sensor installed at a front portion of a vehicle, a stereo camera device installed at an upper portion of a windshield, or the like. In application of the present invention, there is no particular limitation on a method of determining the reaction force set value P.

The microcomputer 56 determines a current instruction value I, which is a control amount to be given to the motor driver IC 58, based on the reaction force set value P. At this time, the microcomputer 56 determines the current instruction value I, for example, based on a relational expression showing a relationship between the current instruction value I and the reaction force set value P. The motor driver IC 58 determines a pulse width, a duty ratio or the like during PWM control based on the current instruction value I, controls a current which is supplied to the power FET 60 and rotates the motor 20.

The power FET 60 includes power FETs 60U, 60V and 60W of a U phase, a V phase and a W phase, and each of the power FETs is connected to a coil of a corresponding phase of the motor 20. The motor driver IC 58 cyclically turns on/off the power FET of each of the phases, thereby generating a magnetic field in the coil of each of the phases and rotating the rotor of the motor 20.

A current detection sensor 66 for detecting a current supplied to the motor 20 and the motor driver IC 58 are connected to the microcomputer 56. The microcomputer 56 receives a signal which indicates the current detected by the current detection sensor 66. In addition to the microcomputer 56, three Hall ICs 64U, 64V and 64W are connected to an input end of the motor driver IC 58, and the motor driver IC 58 receives a change in a voltage output from each of the Hall ICs 64U, 64V and 64W. The motor driver IC 58 outputs a signal indicating the number n of rotation of the motor 20 to the microcomputer 56 based on an input from the Hall ICs 64U, 64V and 64W. Accordingly, the microcomputer 56 detects the number n of rotations of the motor 20. The microcomputer 56 determines the current instruction value I provided to the motor driver IC 58 based on the number n of rotations of the motor 20.

Also, part or all of the host ECU 70 and the microcomputer 56 is a software functional part which functions when a processor such as a central processing unit (CPU) executes a program stored in a memory. Further, part or all of the functional units may be hardware functional parts such as a large scale integration (LSI) and an application specific integrated circuit (ASIC).

Next, in the reaction force output device 10 constituted as described above, control which allows a higher reaction force through the pedal arm 4 serving as the operation element will be described. Also, in the following description, control in which the reaction force set value P is changed by the host ECU 70 to allow the higher reaction force may be performed, and control in which the current instruction value I corresponding to the reaction force set value P is changed by the microcomputer 56 to allow the higher reaction force may also be performed. In the following description, the control in which the current instruction value I is changed to correspond to the reaction force set value P, thereby allowing the higher reaction force, will be described.

Figure 4:
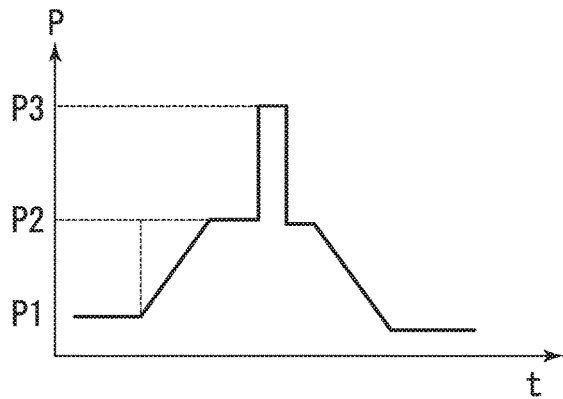
FIG. 4 is a view illustrating a time change of a reaction force set value P (a current instruction value I) in the reaction force output device according to one embodiment.

FIG. 4 is a view illustrating a change of the reaction force set value P in the reaction force output device 10. When the reaction force set value P supplied from the host ECU 70 is increased, the reaction force output device 10 gradually increases the current instruction value I to correspond to the reaction force set value P, maintains the current instruction value I at a constant value P2 and then increases the current instruction value I from P2 to P3 stepwise. Hereinafter, an operation of the reaction force output device 10 when the motor 20 is controlled according to the change in the control amount will be described. The reaction force output device 10 previously stores a change pattern of the current instruction value I corresponding to the reaction force set value P as shown in FIG. 4, determines the change pattern of the reaction force set value P by the microcomputer 56, determines the current instruction value I based on the change pattern and drives the motor 20.

Here, the reaction force $E_F$ applied to the pedal arm 4 is indicated by the following equation.

$$E_F = (1/2)I\omega^2 + F_R - (1/2)mv^2$$

In the above-described equation, $E_F$ is the reaction force applied to the pedal arm 4, I is the current instruction value, and $\omega$ is a rotational angular velocity of the motor 20. $(1/2)I\omega^2$ is a torque of the motor 20 to generate the reaction force from the motor 20. $F_R$ is load energy due to reverse rotation efficiency. $(1/2)mv^2$ is an operating force EP applied by a driver to the pedal arm 4, m is a mass applied by the driver to the pedal arm 4, and v is an operating speed of the pedal arm 4 applied by the driver to the pedal arm 4.

The microcomputer 56 controls the reaction force and notifies the driver of the reaction force of the pedal arm 4 by controlling the current instruction value I.

Figure 5:
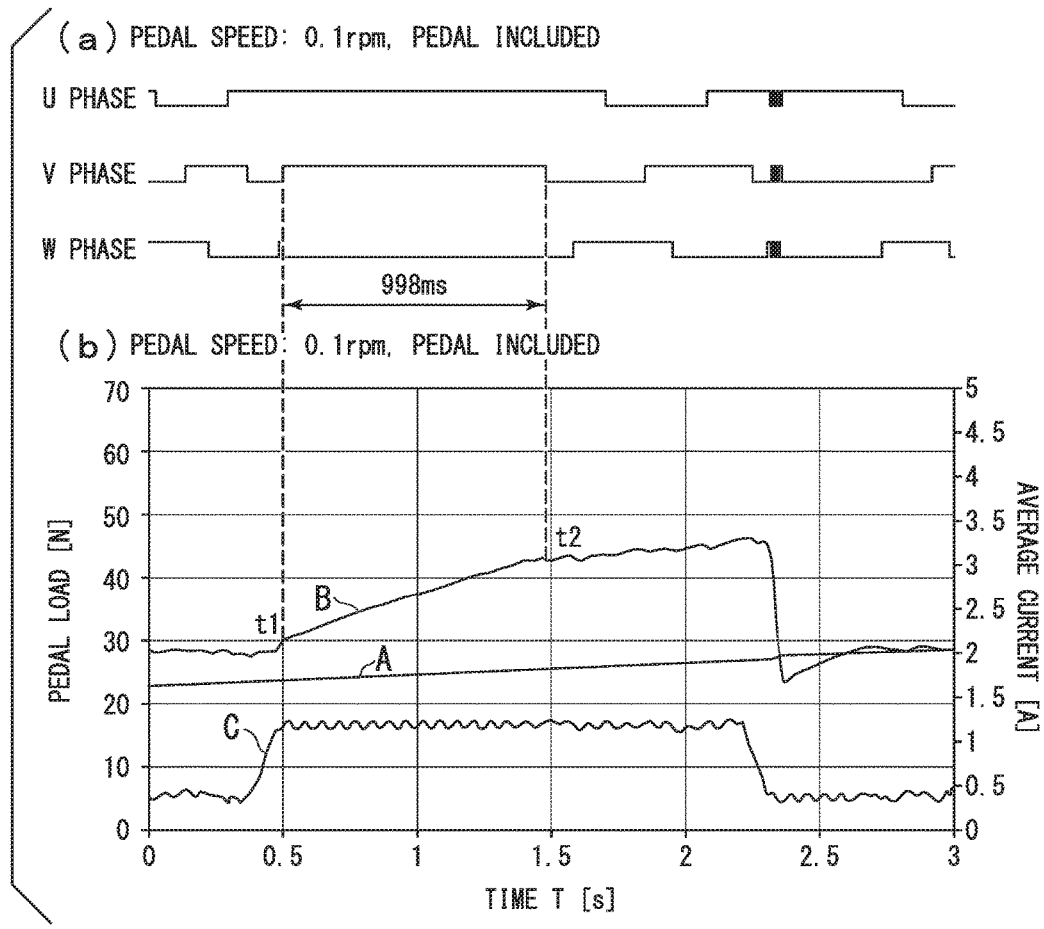
FIG. 5 illustrates a timing chart showing an operation of the reaction force output device having a pedal arm according to one embodiment and illustrates a three-phase current (a), a stroke of the pedal arm (A in (b)), a pedal load (B in (b)) and an average current (C in (b)) when a speed of the pedal arm is 0.1 rpm.

FIG. 5 illustrates a timing chart showing an operation of the reaction force output device 10 having the pedal arm 4 and illustrates a three-phase current (FIG. 5(a)), a stroke of the pedal arm 4 (A in FIG. 5(b)), a pedal load (B in FIG. 5(b)) and an average current (C in FIG. 5(b)) when a speed of the pedal arm 4 is 0.1 rpm.

Figure 6:
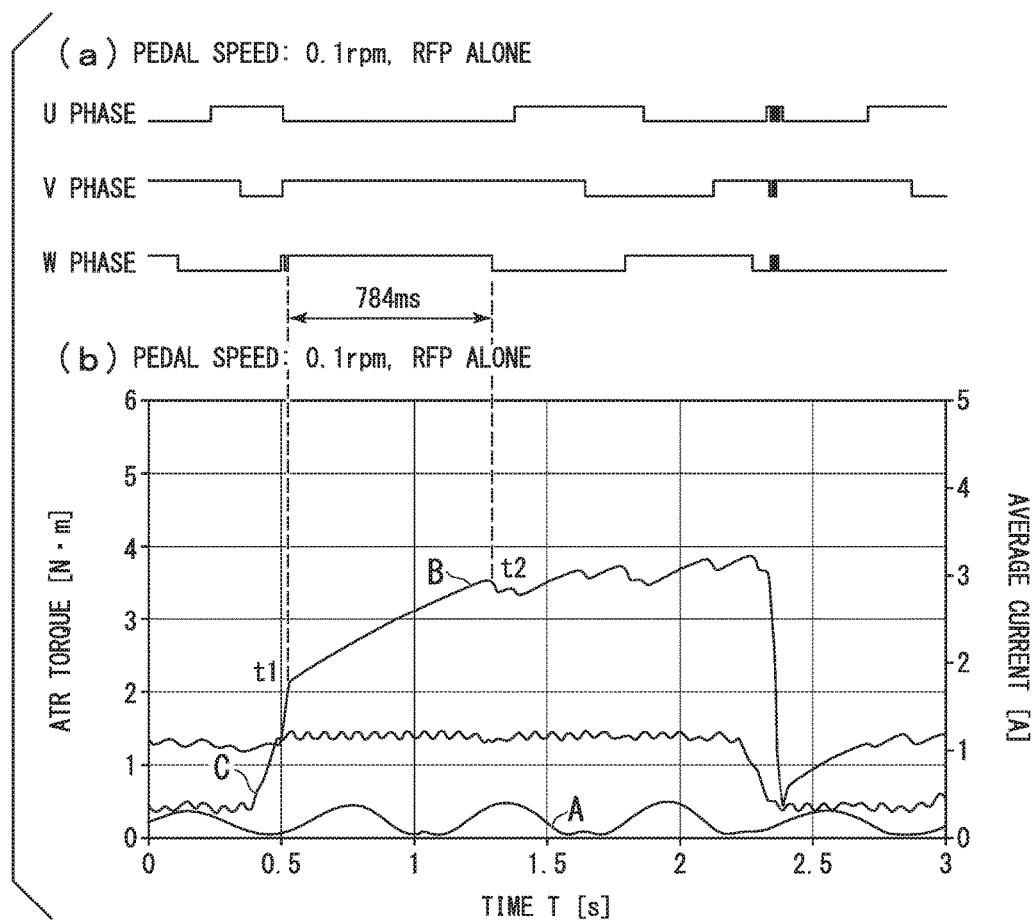
FIG. 6 illustrates a timing chart showing an operation of a constitution in which the pedal arm is excluded from the reaction force output device according to one embodiment and illustrates the three-phase current (a), an average value of a test motor (A in (b)), an ATR torque (B in (b)) and the average current (C in (b)) when the speed of the pedal arm is 0.1 rpm.

FIG. 6 illustrates a timing chart showing an operation of a constitution (the reaction force output device (a reactive force pedal (RFP)) alone) in which the pedal arm 4 is excluded from the reaction force output device 10 and illustrates the three-phase current (FIG. 6(a)), an average value of a test motor (A in FIG. 6(b)), an AIR torque (B in FIG. 6(b)) and the average current (C in FIG. 6(b)) when the speed of the pedal arm 4 is 0.1 rpm.

Also, the ATR torque is a value obtained by measuring a torque of the output lever 12 with a torque measuring apparatus.

When the operation amount of the pedal arm 4 is being increased at a pedal operating speed of 0.1 rpm (A in FIG. 5(b)), the reaction force output device 10 gradually increases the reaction force set value P from P1 to P2 and then maintains the reaction force set value P at a constant value P2. Accordingly, the pedal load (B in FIG. 5(b)) and the average current (C in FIG. 5(b)) are constant values before t1 in FIG. 5.

In the case in which t1 arrives, when the reaction force output device 10 changes the reaction force set value P from P2 to P3 (FIG. 4), a three-phase AC current (FIG. 5(a)) is supplied to the motor 20, and thus the average current (C in FIG. 5(b)) is supplied to the motor 20. As a result, it is possible to increase the pedal load of the pedal arm 4 over a time period (988 ms) from a time t1 to a time t2 (B in FIG. 5(b)).

After t2, since the reaction force output device 10 maintains the reaction force set value P at a constant value of P3, the pedal load (B in FIG. 5(b)) and the average current (C of FIG. 5(b)) are substantially constant values. Then, when the reaction force output device 10 decreases the reaction force set value P stepwise from P3 to P2 (FIG. 4), the pedal load (B in FIG. 5(b)) and the average current (C of FIG. 5(b)) are sharply reduced.

Meanwhile, according to FIG. 6, when the reaction force set value P is increased stepwise from P2 to P3 (FIG. 4), the pedal load can be increased over the time period (784 ms) from time t1 to t2 (B in FIG. 6(b)).

According to FIGS. 5 and 6, a rise time (784 ms) of the AIR torque when the pedal arm 4 is not connected to the reaction force output device 10 is shorter than a rise time (988 ms) of the pedal load.

Also the operation before t1 and the operation after t2 are the same in the following description.

Figure 7:
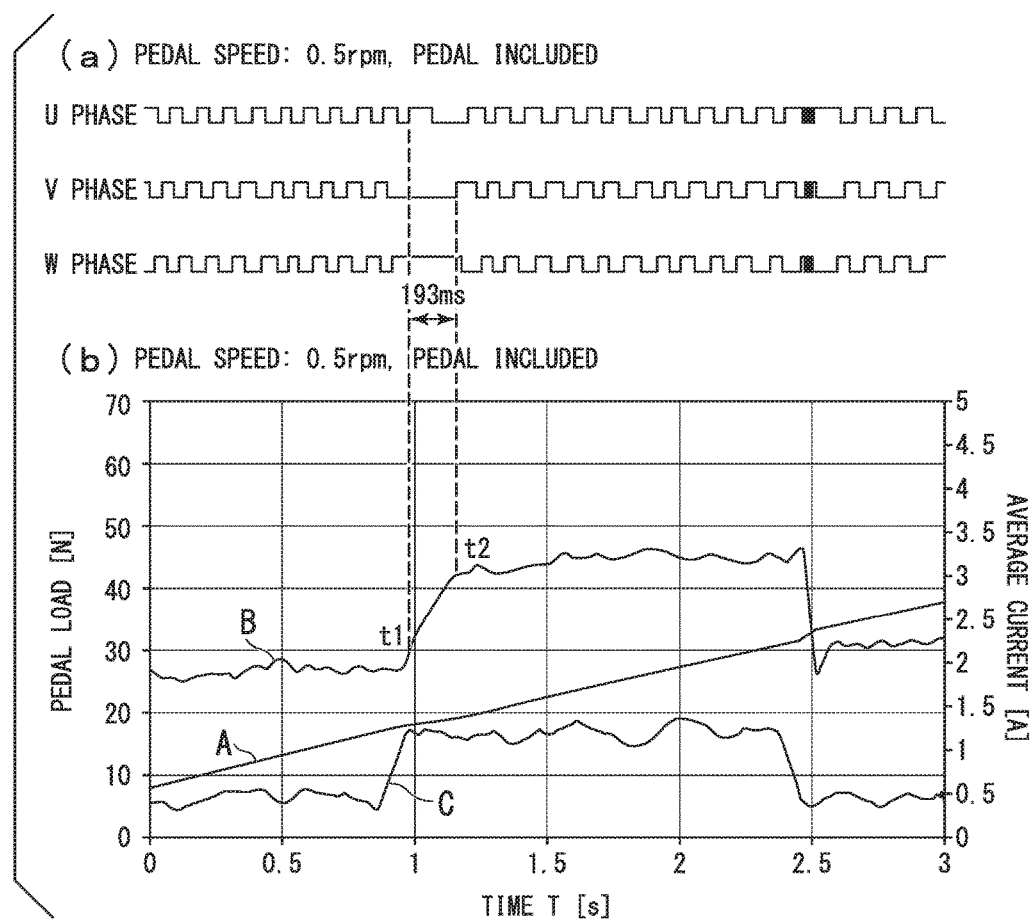
FIG. 7 illustrates a timing chart showing the operation of the reaction force output device having the pedal arm according to one embodiment and illustrates the three-phase current (a), the stroke of the pedal arm (A in (b)), the pedal load (B in (b)) and the average current (C in (b)) when the speed of the pedal arm is 0.5 rpm.

FIG. 7 illustrates a timing chart showing the operation of the reaction force output device 10 having the pedal arm 4 and illustrates the three-phase current (FIG. 7(a)) the stroke of the pedal arm 4 (A in FIG. 7(b)), the pedal load (B in FIG. 7(b)) and the average current (C in FIG. 7(b)) when the speed of the pedal arm 4 is 0.5 rpm.

Figure 8:
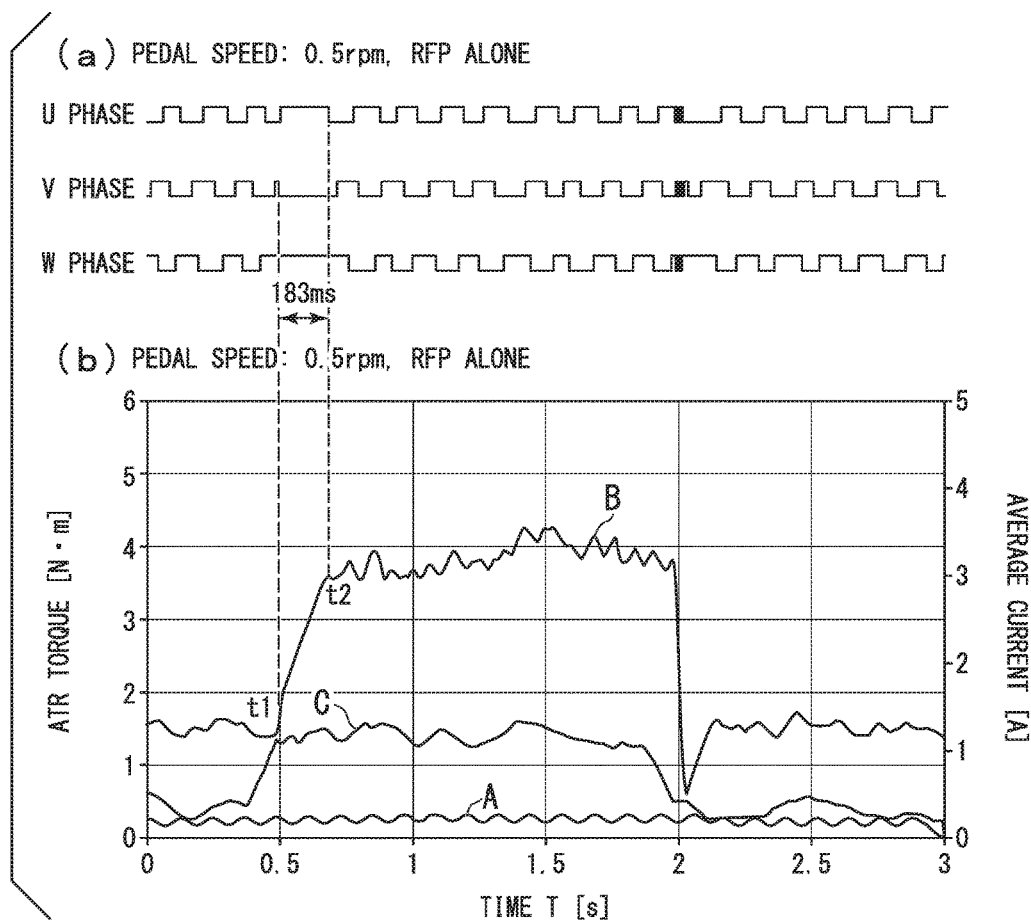
FIG. 8 illustrates a timing chart showing the operation of the constitution in which the pedal arm is excluded from the reaction force output device according to one embodiment and illustrates the three-phase current (a), the average value of the test motor (A in (b)), the ATR torque (B in (b)) and the average current (C in (b)) when the speed of the pedal arm is 0.5 rpm.

FIG. 8 illustrates a timing chart showing the operation of the constitution in which the pedal arm 4 is excluded from the reaction force output device 10 and illustrates the three-phase current (FIG. 8(a)), the average value of the test motor (A in FIG. 8(b)), the ATR torque (B in FIG. 8(b)) and the average current (C in FIG. 8(b)) when the speed of the pedal arm 4 is 0.5 rpm.

When the reactive force set value P is increased stepwise from P2 to P3 (FIG. 4) while the operation amount of the pedal arm 4 is being increased at a pedal operating speed of 0.5 rpm (A in FIG. 7(b)), the pedal load of the pedal arm 4 can be increased over the time period (193 ms) from the time t1 to the time t2 (B in FIG. 7(b)).

Meanwhile, according to FIG. 8, when the reaction force set value P is increased stepwise from P2 to P3 (FIG. 4), the pedal load can be increased over the time period (183 ms) from the time t1 to the time t2 (B in FIG. 8(b)).

According to FIGS. 7 and 8, the rise time (183 ms) of the ATR torque when the pedal arm 4 is not connected to the reaction force output device 10 is shorter than the rise time (193 ms) of the pedal load.

Figure 9:
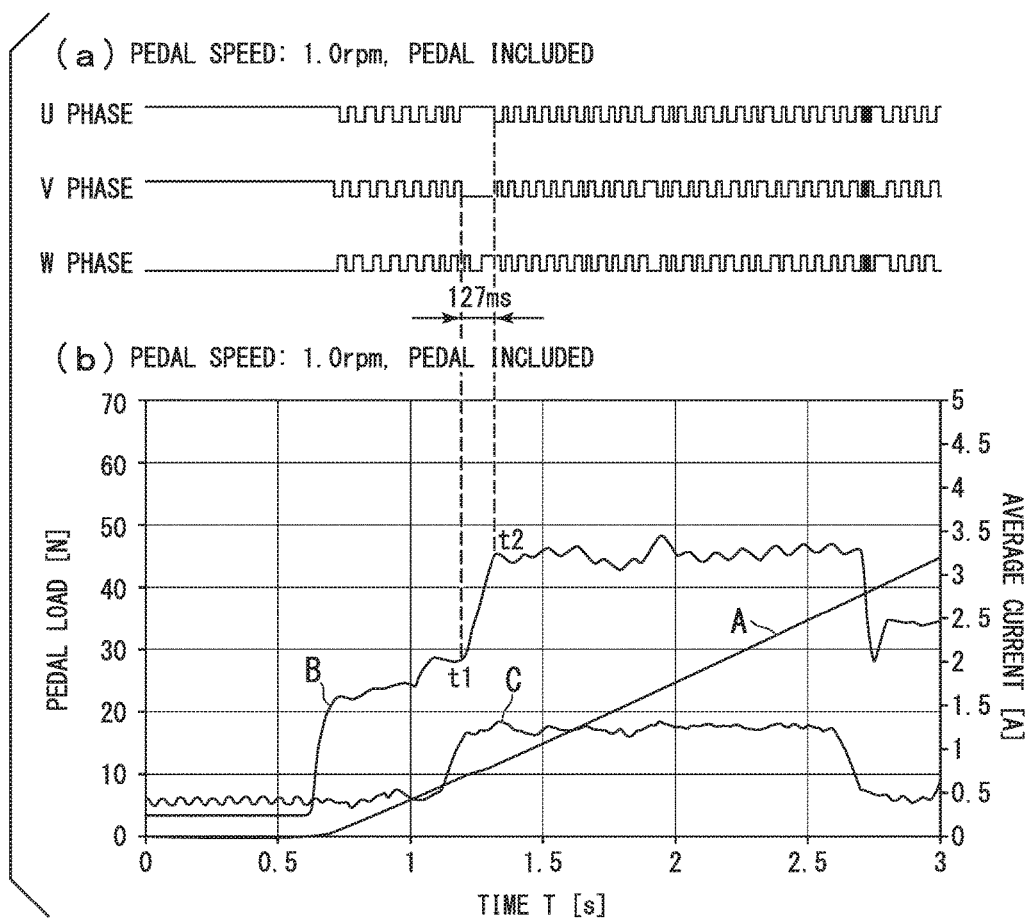
FIG. 9 illustrates a timing chart showing the operation of the reaction force output device having the pedal arm according to one embodiment and illustrates the three-phase current (a), the stroke of the pedal arm (A in (b)), the pedal load (B in (b)) and the average current (C in (b)) when the speed of the pedal arm is 1.0 rpm.

FIG. 9 illustrates a timing chart showing the operation of the reaction force output device 10 having the pedal arm 4 and illustrates the three-phase current (FIG. 9(a)), the stroke of the pedal arm 4 (A in FIG. 9(b)), the pedal load (B in FIG. 9(b)) and the average current (C in FIG. 9(b)) when the speed of the pedal arm 4 is 1.0 rpm.

Figure 10:
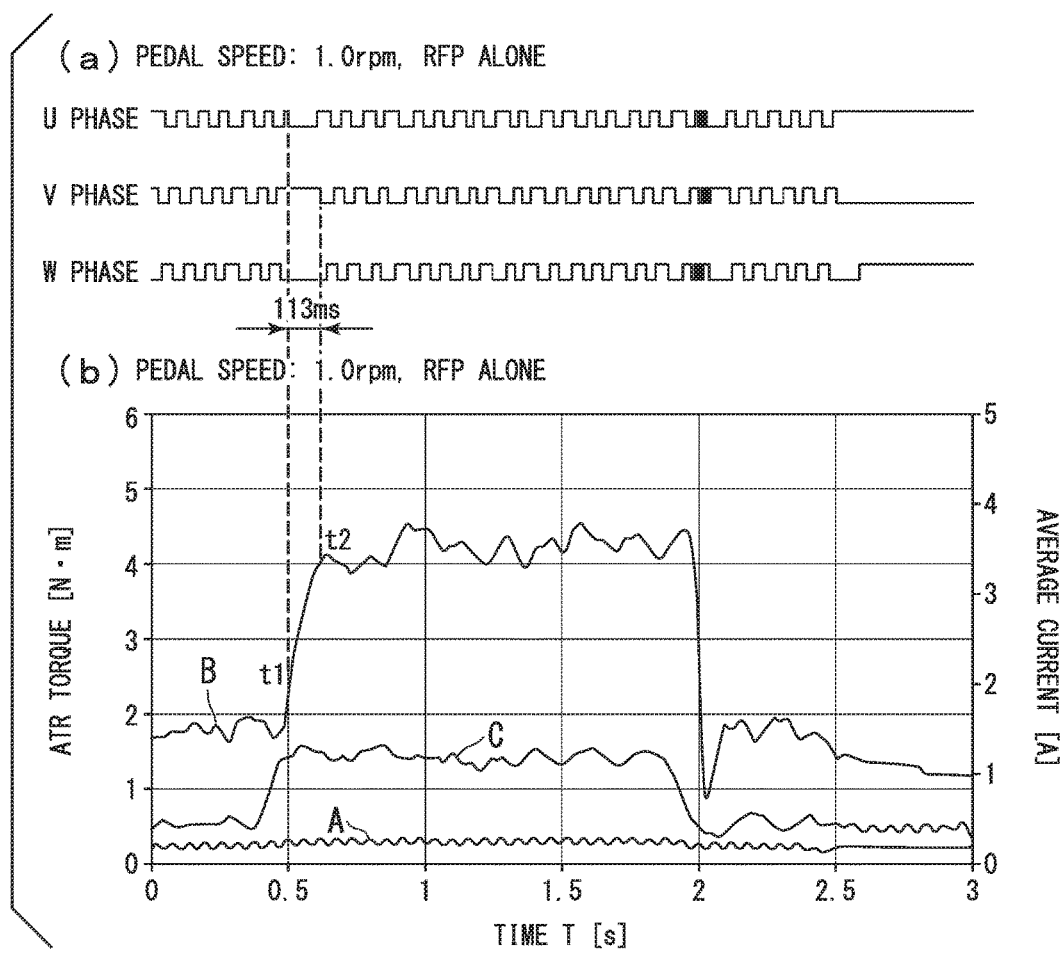
FIG. 10 illustrates a timing chart showing the operation of the constitution in which the pedal arm is excluded from the reaction force output device according to one embodiment and illustrates the three-phase current (a), the average value of the test motor (A in (b)), the ATR torque (B in (b)) and the average current (C in (b)) when the speed of the pedal arm is 1.0 rpm.

FIG. 10 illustrates a timing chart showing the operation of the constitution in which the pedal arm 4 is excluded from the reaction force output device 10 and illustrates the three-phase current (FIG. 10(a)), the average value of the test motor (A in FIG. 10(b)), the ATR torque (B in FIG. 10(b)) and the average current (C in FIG. 10(b)) when the speed of the pedal arm 4 is 1.0 rpm.

When the reaction force set value P is increased stepwise from P2 to P3 (FIG. 4) while the operation amount of the pedal arm 4 is being increased at a pedal operating speed of 1.0 rpm (A in FIG. 9(b)), the pedal load of the pedal arm 4 can be increased over the time period (127 ms) from the time t1 to the time t2 (B in FIG. 9(b)).

Meanwhile, according to FIG. 10, when the reaction force set value P is increased stepwise from P2 to P3 (FIG. 4), the pedal load can be increased over the time period (113 ms) from the time t1 to the time t2 (B in FIG. 10(*b*)).

According to FIGS. 9 and 10, the rise time (113 ms) of the AIR torque when the pedal arm 4 is not connected to the reaction force output device 10 is shorter than the rise time (127 ms) of the pedal load.

According to the reaction force output device 10 described above, the pedal load can be increased at t1 to t2 by gradually increasing the reaction force set value P from P1 to P2 and then increasing the reaction force set value P stepwise from P2 to P3 over t1 to t2. Accordingly, the reaction force output device 10 allows the driver to feel the higher reaction force due to an increase in the pedal load.

The rise time of the pedal load of the reaction force output device 10 including the pedal arm 4 becomes longer than that of the ATR torque of the reaction force output device 10 excluding the pedal arm 4. As a result, it can be understood that rigidity of the pedal arm 4 is one factor that abates the rise of the pedal load. That is, even if the reaction force output device 10 including the pedal arm 4 changes the reaction force set value P stepwise, an inclination of the increase in the actual pedal load is gentler than that of the increase in the ATR of the reaction force output device excluding the pedal arm 4.

Based on this fact, according to the reaction force output device 10, it is possible to allow the driver to feel the higher reaction force by changing the reaction force set value P stepwise in consideration of the abatement of the rise of the pedal load due to the connection of the pedal arm 4.

Figure 11:
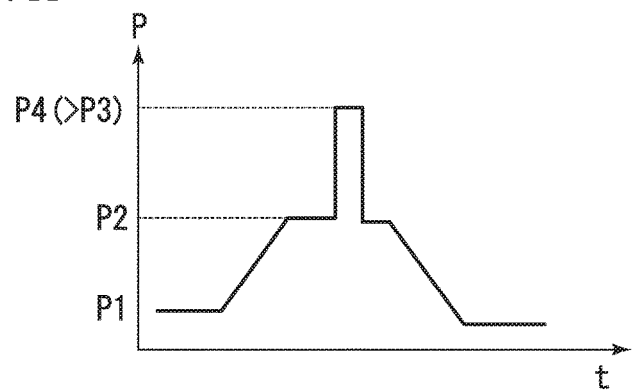
FIG. 11 is another view illustrating a change of the reaction force set value P (the current instruction value I) in the reaction force output device according to one embodiment.

FIG. 11 is another view illustrating a change of the reaction force set value P in the reaction force output device 10. According to FIG. 11, the reaction force output device 10 increases the reaction force set value P stepwise from P2 to P4. P4 is higher than P3 shown in FIG. 4 and is, for example, twice as large as P3 in the embodiment.

Figure 12:
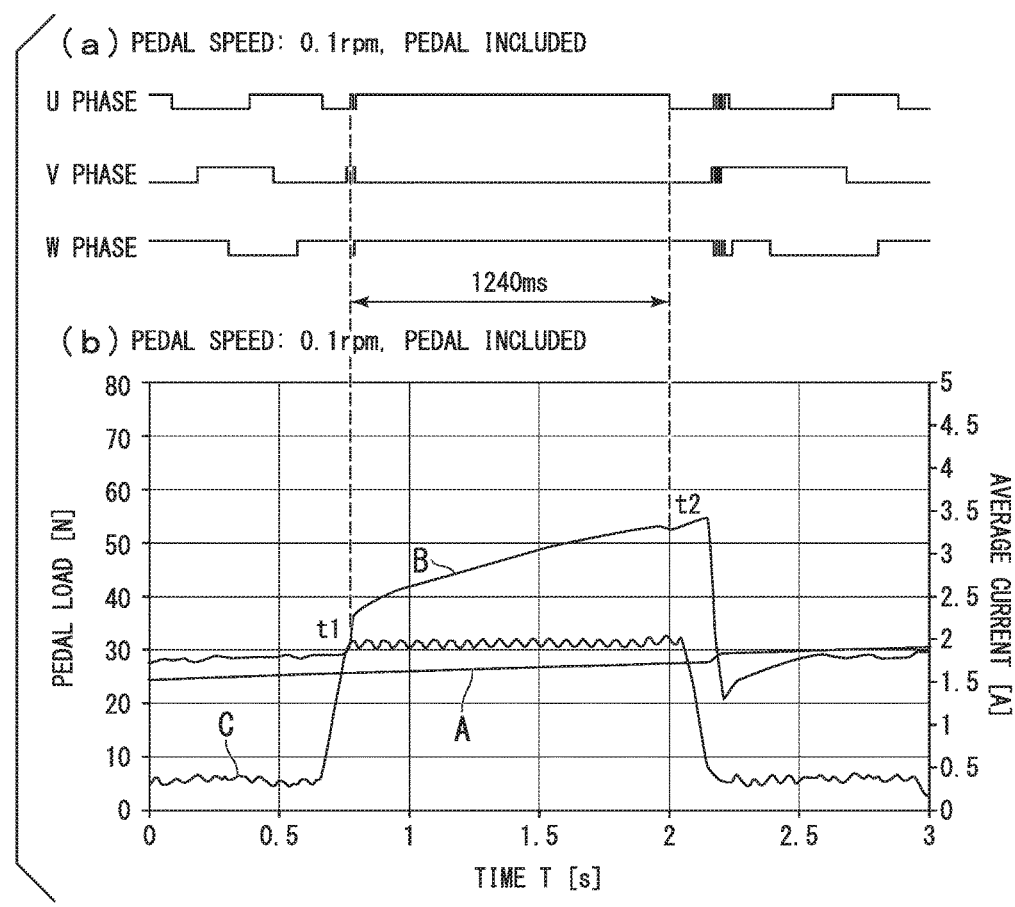
FIG. 12 illustrates a timing chart showing another operation of the reaction force output device according to one embodiment and illustrates the three-phase current (a), the stroke of the pedal arm (A in (b)), the pedal load (B in (b)) and the average current (C in (b)) when the speed of the pedal arm is 1.0 rpm.

FIG. 12 illustrates a timing chart showing the operation of the reaction force output device 10 including the pedal arm 4 and illustrates the three-phase current (FIG. 12(*a*)), the stroke of the pedal arm 4 (A in FIG. 12(*b*)), the pedal load (B in FIG. 12(*b*)) and the average current (C in FIG. 12(*b*)) when the speed of the pedal arm 4 is 1.0 rpm.

Figure 13:
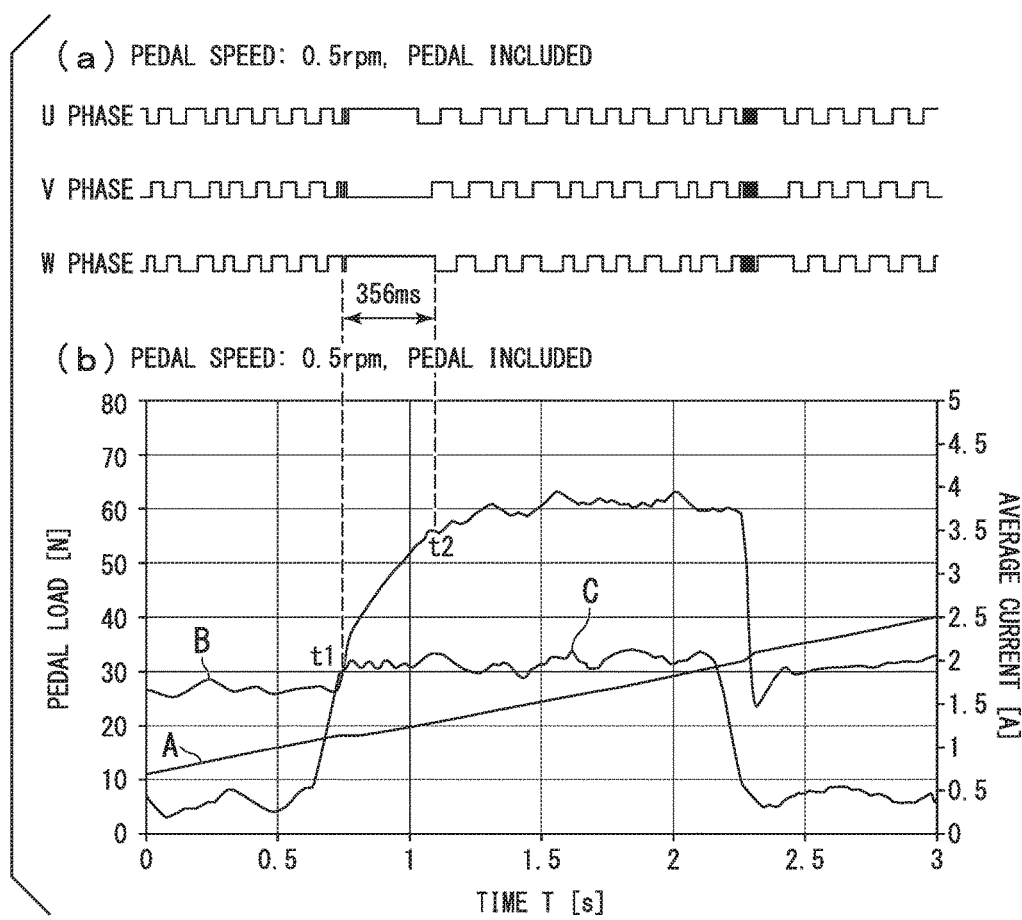
FIG. 13 illustrates a timing chart showing another operation of the reaction force output device according to one embodiment and illustrates the three-phase current (a), the stroke of the pedal arm (A in (b)), the pedal load (B in (b)) and the average current (C in (b)) when the speed of the pedal arm is 0.5 rpm.

FIG. 13 illustrates a timing chart showing the operation of the reaction force output device 10 including the pedal arm 4 and illustrates the three-phase current (FIG. 13(*a*)), the stroke of the pedal arm 4 (A in FIG. 13(*b*)), the pedal load (B in FIG. 13(*b*)) and the average current (C in FIG. 13(*b*)) when the speed of the pedal arm 4 is 0.5 rpm.

Figure 14:
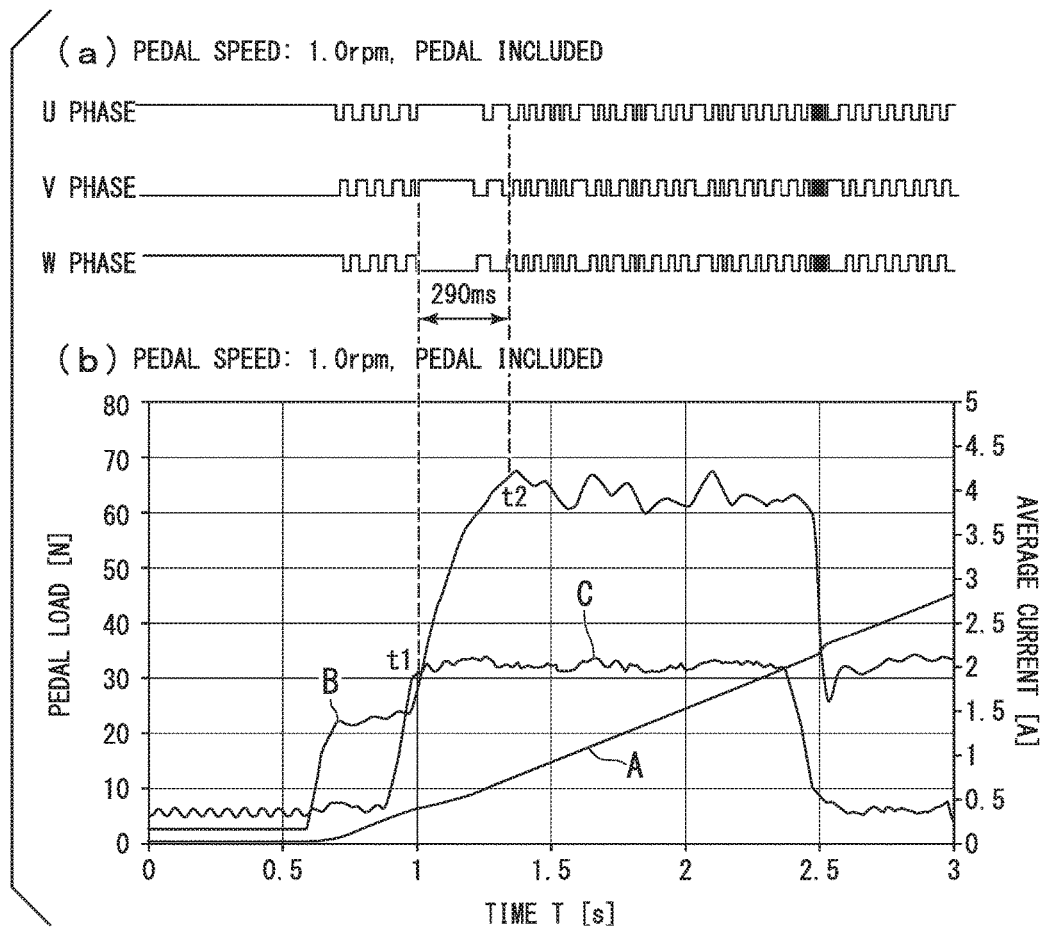
FIG. 14 illustrates a timing chart showing another operation of the reaction force output device according to one embodiment and illustrates the three-phase current (a), the stroke of the pedal arm (A in (b)), the pedal load (B of (b)) and the average current (C of (b)) when the speed of the pedal arm is 1.0 rpm.

FIG. 14 illustrates a timing chart showing the operation of the reaction force output device 10 including the pedal arm 4 and illustrates the three-phase current (FIG. 14(*a*)), the stroke of the pedal arm 4 (A in FIG. 14(*b*)), the pedal load (B of FIG. 14(*b*)) and the average current (C of FIG. 14(*b*)) when the speed of the pedal arm 4 is 1.0 rpm.

When the reaction force set value P is increased stepwise from P2 to P4 (FIG. 11) while the operation amount of the pedal arm 4 is being increased at a pedal operating speed of 0.1 rpm (A in FIG. 12(*b*)), the pedal load of the pedal arm 4 can be increased over the time period (1240 ms) from the time t1 to the time t2 (B in FIG. 12(*b*)).

When the reaction force set value P is increased stepwise from P2 to P4 (FIG. 11) while the operation amount of the pedal arm 4 is being increased at a pedal operating speed of 0.5 rpm (A in FIG. 13(*b*)), the pedal load of the pedal arm 4 can be increased over the time period (356 ms) from the time t1 to the time t2 (B in FIG. 13(*b*)).

When the reaction force set value P is increased stepwise from P2 to P4 (FIG. 11) while the operation amount of the pedal arm 4 is being increased at a pedal operating speed of 1.0 rpm (A in FIG. 14(*b*)), the pedal load of the pedal arm 4 can be increased over the time period (290 ms) from the time t1 to the time t2 (B in FIG. 14(*b*)).

According to FIGS. 12 to 14, as the pedal operating speed is increased, the rise time of the pedal load becomes shorter. Therefore, according to the reaction force output device 10, as the pedal operating speed is increased, the higher reaction force can be felt through the pedal arm 4. In addition, a rise width of the pedal load is increased as the pedal operating speed is increased.

Figure 15:
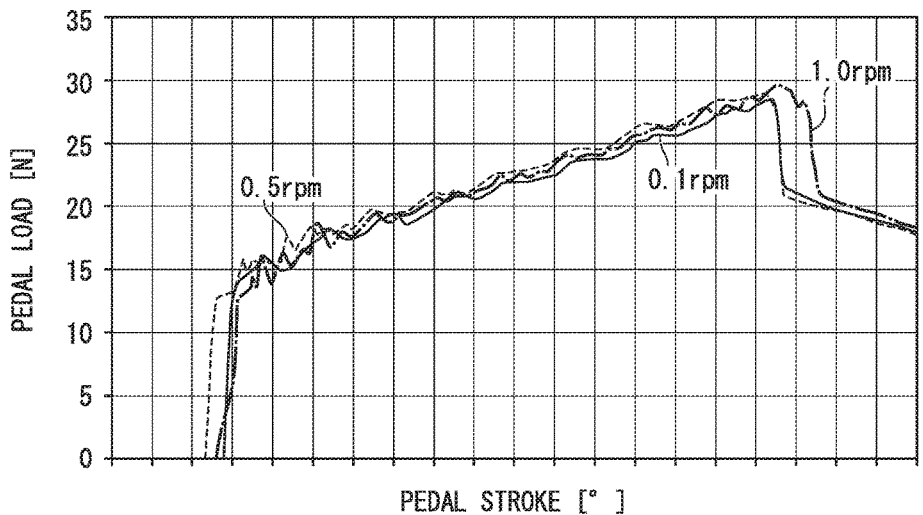
FIG. 15 is a view illustrating a relationship between the pedal load and the stroke of the pedal arm in a non-energized state of the motor for each pedal operating speed in the reaction force output device according to one embodiment.

FIG. 15 is a view illustrating a relationship between the pedal load and the stroke of the pedal arm 4 in a non-energized state of the motor 20. In FIG. 15, the pedal load is shown at every pedal operating speed of 0.1 rpm, 0.5 rpm and 1.0 rpm.

According to FIG. 15, it can be understood that there is no great difference in the pedal load according to the pedal operating speed during the non-energized state of the motor 20. Therefore, it can be understood that the reaction force output device 10 is affected less by mechanical inertia with respect to the pedal load. As a result, the reaction force output device 10 can raise the pedal load regardless of presence or absence of inertia in the reaction force output device 10 and can allow the higher reaction force.

In the reaction force output device 10 of the above-described embodiment, control which allows a high reaction force when the pedal arm 4 is fixed will be described.

Figure 16:
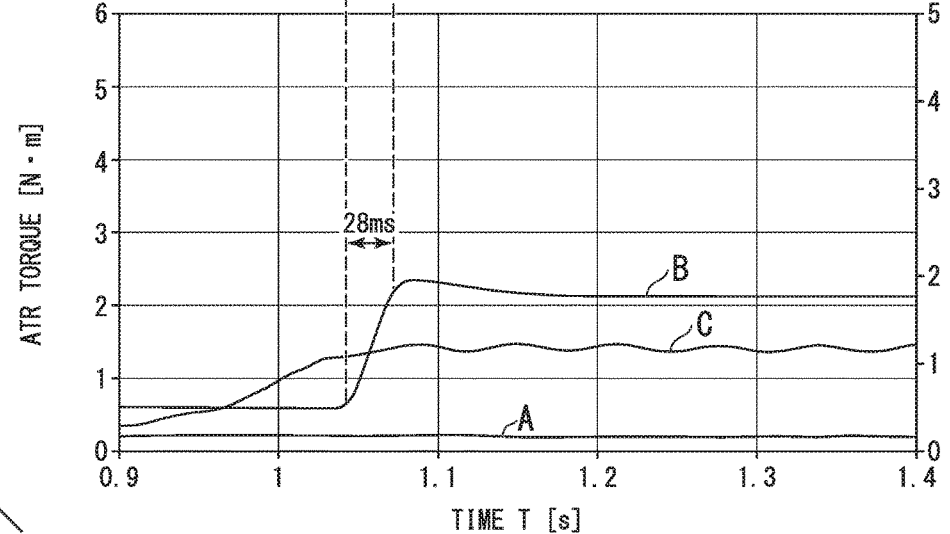
FIG. 16 is a timing chart showing the three-phase current (a), the average value of the test motor (A in (b)), the ATR torque (B in (b)) and the average value current (C in (b)) when the reaction force set value P (the current instruction value I) is changed from P2 to P3 while the pedal arm of the reaction force output device according to one embodiment is fixed.

FIG. 16 is a timing chart showing the three-phase current (FIG. 16(*a*)), the average value of the test motor (A in FIG. 16(*b*)), the ATR torque (B in FIG. 16(*b*)) and the average value current (C in FIG. 16(*b*)) when the reaction force set value P is increased stepwise from P2 to P3 as shown in FIG. 4 while the pedal arm 4 is fixed.

FIG. 17 is a timing chart showing the three-phase current (FIG. 17(*a*)), the average value of the test motor (A in FIG. 17(*b*)), the ATR torque (B in FIG. 17(*b*)) and the average value current (C in FIG. 17(*b*)) when the reaction force set value P is increased stepwise from P2 to P4 (>P3) as shown in FIG. 11 while the pedal arm 4 is fixed.

According to FIGS. 16 and 17, even when the pedal arm 4 is not operated, the ATR torque can be raised for a rise time of about 30 ms by changing the reaction force set value P as shown in FIG. 4 or FIG. 11. Therefore, according to the reaction force output device 10, even when a user is in contact with the pedal arm 4 and the pedal arm 4 is fixed at a certain position, the higher reaction force can be felt.

According to the reaction force output device 10 according to the embodiment to which the present invention is applied as described above, since the reaction force set value P is gradually increased, maintained at a constant value and then increased stepwise, it is possible to allow the higher reaction force through the operation element. That is, according to the reaction force output device 10, since the current instruction value I is gradually increased to correspond to the reaction force set value P supplied from the outside, maintained at a constant value and then increased stepwise the current instruction value I to correspond to the reaction force set value P, it is possible to allow the higher reaction force through the pedal arm 4.

For example, the pedal arm 4 may be depressed more than necessary when the vehicle starts or runs. In this case, since the reaction force set value P is sharply increased by the operation of the driver, it is difficult for the driver to feel the reaction force even when the current instruction value I corresponding to the reaction force set value P is simply increased stepwise. On the other hand, according to the reaction force output device 10, the current instruction value I is gradually increased according to the reaction force set value P based on the operation, maintained at a constant value and then increased stepwise, and thus it is possible to allow the higher reaction force.

Further, when an increase amount of the reaction force set value P per unit time exceeds a predetermined value, the reaction force output device 10 gradually increases the current instruction value I to correspond to the reaction force set value P, maintains the current instruction value I at a constant value and then increases the current instruction value I stepwise to correspond to the reaction force set value P. Therefore, when the pedal arm 4 is depressed more than necessary, control in which the current instruction value I is gradually increased, maintained at the constant value and then increased stepwise is performed, and thus it is possible to allow the higher reaction force.

Here, a predetermined value of the increase amount of the reaction force set value P may be set based on an experiment result or the like as a value when the preset pedal arm 4 is suddenly depressed. Also, the reaction force output device 10 may set a predetermined value of the current instruction value I corresponding to the reaction force set value P instead of the predetermined value of the increase amount of the reaction force set value P. When the current instruction value I corresponding to the reaction force set value P exceeds the predetermined value, the current instruction value I may be controlled to be gradually increased, to be maintained at the constant value and then to be increased stepwise.

Also, according to the reaction force output device 10, as the pedal operating speed of the pedal arm 4 is higher, a time in which the reaction force set value P or the current instruction value I is increased stepwise is shortened, and thus the inclination of the increase of the reaction force set value P or the current instruction value I is increased, and it is possible to increase the pedal load in a short time, thereby allowing the driver to feel the higher reaction force.

While several embodiments of the invention have been described, these embodiments have been provided as examples and are not intended to limit the scope of the invention. These embodiments can be implemented in various other forms, and various omissions, substitutions, and changes can be made without departing from the gist of the invention. These embodiments and modifications thereof are included in the scope or gist of the invention as well as within the invention described in the claims and the equivalent scope thereof.

REFERENCE SIGNS LIST

1 Accelerator pedal apparatus
2 Pedal body unit
4 Pedal arm
6 Pedal body portion
10 Reaction force output device
12 Output lever
20 Motor
30 Gear reduction mechanism
50 Circuit board
56 Microcomputer
70 Host ECU
72 Engine

The invention claimed is:

1. A reaction force output device comprising:
a driving part configured to transmit a driving force of a motor to a driving member through a gear mechanism to drive the driving member, thereby outputting a force to an operation element operated by a driver in direction opposite to an operating direction of the operation element; and
a controller configured to determine a control amount applied to the driving part based on an input value supplied from an outside,
wherein the controller gradually increases the control amount, maintains the control amount at a first constant value, then increases the control amount stepwise to a second constant value, and then holds the control amount at the second constant value when increasing the control amount according to the input value.

2. The reaction force output device according to claim 1, wherein the controller gradually increases the control amount, maintains the control amount at a first constant value, then increases the control amount stepwise to a second constant value, and then holds the control amount at the second constant value when an increase amount of the input value per unit time exceeds a predetermined value.

3. The reaction force output device according to claim 1, wherein the controller shortens a time in which the control amount is increased stepwise as an operating speed of the operation element is increased, and thus an inclination of an increase of the control amount is increased.

* * * * *